United States Patent [19]

Torrington

[11] 4,211,421
[45] Jul. 8, 1980

[54] VIDEO DISC PLAYER HAVING ADJUSTABLE END-OF-PLAY SWITCH

[75] Inventor: Leslie A. Torrington, Indianapolis, Ind.

[73] Assignee: RCA Corporation, New York, N.Y.

[21] Appl. No.: 964,633

[22] Filed: Nov. 29, 1978

[51] Int. Cl.² ............................................. G11B 3/06
[52] U.S. Cl. ................................. 274/9 B; 274/13 R
[58] Field of Search ............... 358/128; 274/9 R, 9 B, 274/9 RA, 13 R–15 R, 23 A

[56] References Cited

U.S. PATENT DOCUMENTS

| | | | |
|---|---|---|---|
| 3,369,813 | 2/1968 | Nagashima et al. | 274/15 R X |
| 3,870,320 | 3/1975 | Torrington | 274/23 A |
| 3,993,315 | 11/1976 | Hansen et al. | 274/9 R |
| 4,086,617 | 4/1978 | Baker | 274/9 RA X |
| 4,118,039 | 10/1978 | Kurata et al. | 274/9 RA |

Primary Examiner—Charles E. Phillips
Attorney, Agent, or Firm—Eugene M. Whitacre; Joseph S. Tripoli; Dilip A. Kulkarni

[57] ABSTRACT

A player, such as a video disc player, includes a signal pickup carriage, which carries a travel-limit switch and which is translated during playback toward the turntable center in correlation with the speed of rotation of the turntable. The player is provided with a movable endless belt, which carries a stop element and which extends along a path parallel to the carriage path. A time-setting wheel is coupled to the belt for selectively positioning the stop element. The position of the stop element determines the point at which the carriage-mounted switch engages the stop element during carriage translation toward the turntable center. The engagement between the two elements shuts off power to the turntable motor and lifts the stylus away from a turntable-supported record.

5 Claims, 7 Drawing Figures

VIDEO DISC PLAYER HAVING ADJUSTABLE END-OF-PLAY SWITCH

This invention generally relates to a video disc player, and more particularly, to a record player having a manually adjustable end-of-play switch.

In certain video disc systems, information is stored on a disc record in the form of geometric variations in the bottom of a continuous spiral groove disposed on the record surface. Such systems typically include a turntable for centering and rotatably supporting a record for playback. The variations in capacitance between an electrode incorporated in a groove-riding stylus and a conductive coating disposed on the record surface are sensed during playback to reproduce the stored information. A capacitance-type video disc system is illustratively described in U.S. Pat. No. 3,842,194 (Clemens).

In such systems, it is advantageous to mount a groove-riding pickup stylus in a demountable cartridge. The player includes a carriage having a compartment for receiving the demountable cartridge. The carriage is driven during playback along carriage guiding rails in correlation with the motion of the groove-riding stylus. U.S. Pat. No. 3,870,320 (Torrington), discloses a type of carriage translating system.

It is beneficial to enclose a record in a thin plastic caddy. For record loading, an occupied caddy is inserted into an input slot provided in the player. The player is equipped with another set of rails for guiding caddy insertion along a path. A record extracting mechanism disposed in the player removes the record from the caddy during subsequent caddy withdrawal, whereby the record is retained in the player. The player is equipped with a platform for supporting the retained record when it is disposed in an elevated position. The retained record is transferred to the turntable for playback during motion of the platform to a depressed position. For subsequent record retrieval, the platfrom with the retained record resting thereon is raised, and an empty caddy is inserted into the player, thereby returning the record back into the caddy. Withdrawal of the caddy, effects record retrieval from the player. U.S. Pat. No. 4,098,511 (Leedom), and patent applications, Ser. Nos. 747,729 (Coleman), now U.S. Pat. No. 4,124,866, and 801,604 (Torrington), now U.S. Pat. No. 4,133,540, illustratively describe player systems suitable for use with a record caddy. The above patent and applications are assigned of record to the assignee of the instant application.

In a concurrently-filed, copending U.S. patent application, Ser. No. 964,536 of Torrington, entitled "VIDEO DISC PLAYER", a novel video disc player design is described. In the therein disclosed design, the carriage is translated along a path disposed substantially parallel to the path of caddy insertion. Pursuant to a further feature of the Torrington invention, the direction of translation of the carriage during playback is opposite to the direction of the caddy insertion. The location of the caddy path relative to the carriage path is such that the caddy engages the carriage when the carriage is at a position other than at a starting position during a caddy insertion, whereby the carriage is restored to the starting position. The Torrington application is assigned of record to the assignee of the instant application.

In a low-cost video disc player of the Torrington type, one may provide an end-of-play switch which would raise the stylus and stop the turntable at the end of a fixed time period (e.g., 60 minutes). A disadvantage of this approach is that when disc records with shorter playing times (e.g., 15 or 30 minutes) are played, the stylus unnecessarily wears during the period extending between the conclusion of the program to the time the end-of-play switch is activated at the termination of a fixed time interval (e.g., 60 minutes).

In accordance with the principles of the present invention, the player includes an apparatus for selectively positioning a stop element for varying the point at which a carriage-mounted switch element contacts the stop element during carriage translation toward the turntable center to activate an end-of-play switch, thereby stopping the turntable and raising the signal pickup away from the record to prevent unnecessary, postplay stylus wear. In accordance with another aspect of the instant invention, a time-setting, thumbwheel is provided for manually changing the position of the stop element. Pursuant to a still further feature of the subject invention, the position of the stop element is automatically set by a mechanically-coded, record caddy to a location appropriate to the playing time of the enclosed record when the caddy is inserted into the player for loading the record.

IN THE DRAWINGS

Figure 1:
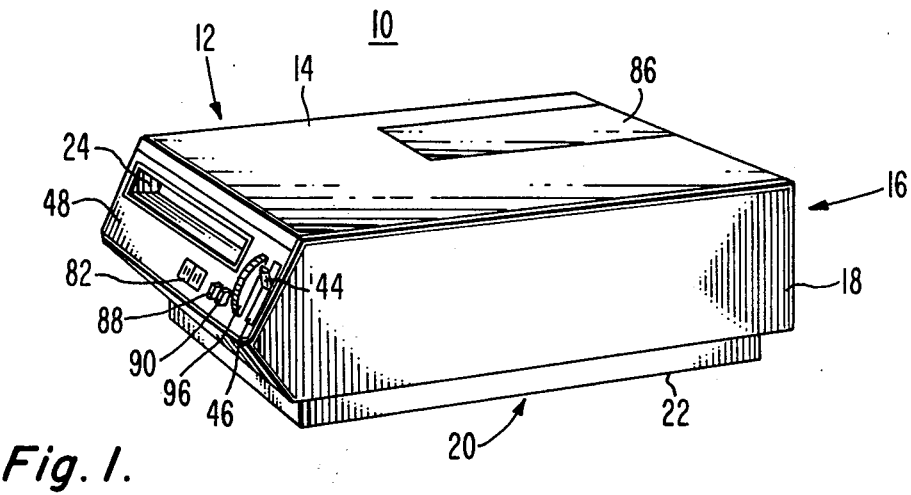
FIG. 1 illustrates a video disc player of the type described in the aforesaid, concurrently-filed Torrington application.
Figure 2:
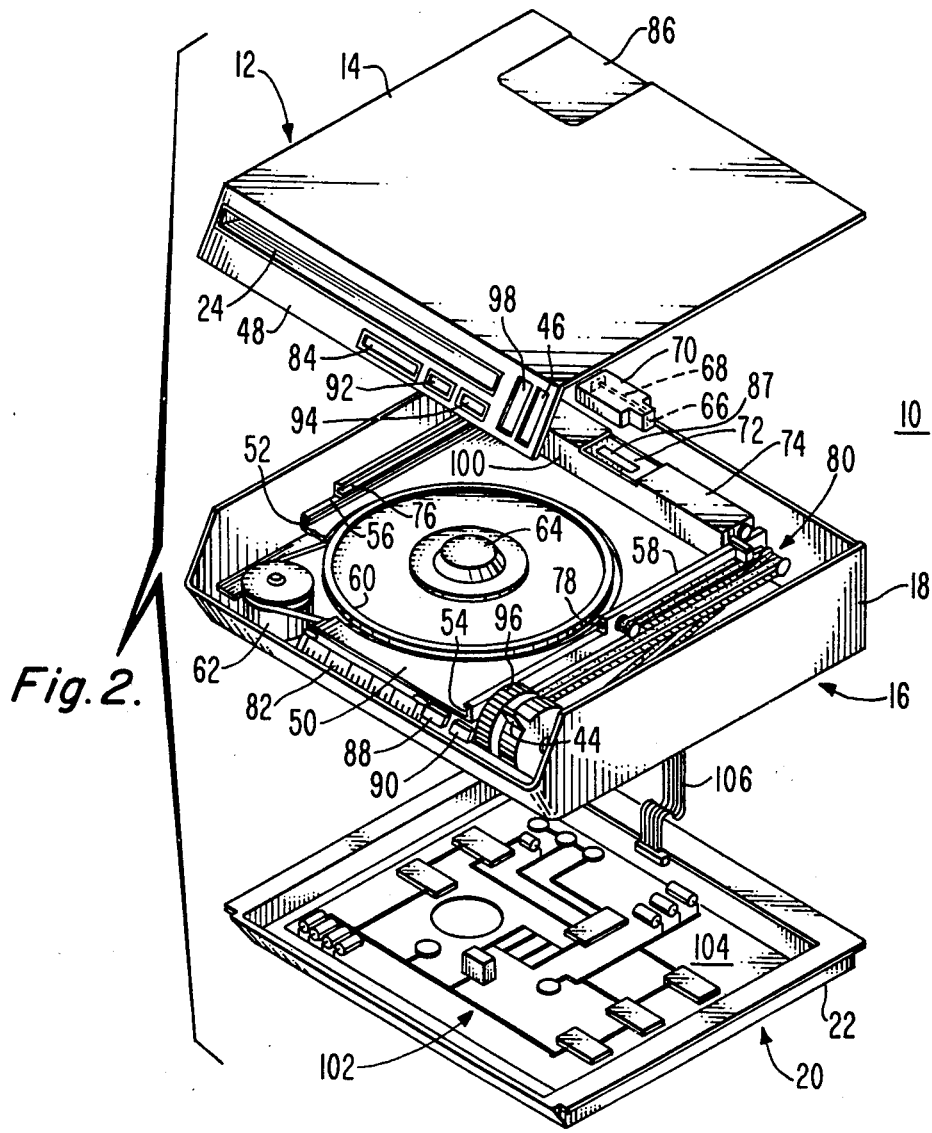
FIG. 2 shows an exploded perspective view of the player of FIG. 1.

Shown in FIGS. 1-2 is a video disc player 10 of the aforesaid Torrington type. The player comprises a decorative cover member 12 having a top wall 14, a trough member 16 having perimetrical side walls 18 and a base member 20 having a bottom wall 22. The player has an input slot 24, disposed in the cover member, through which a record carrying caddy 25 is inserted for loading an enclosed record into the player.

Figure 3:
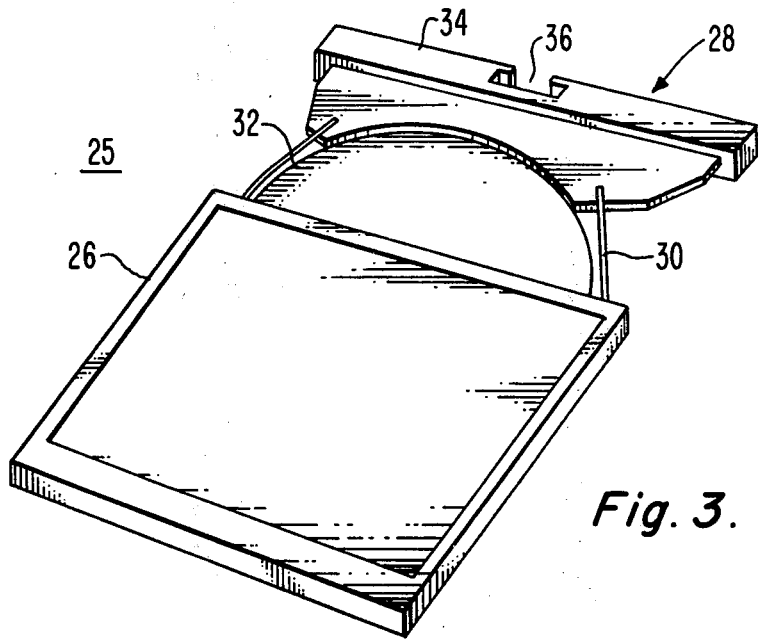
FIG. 3 shows a record bearing caddy suitable for use with the player of FIGS. 1 and 2.
Figure 4:
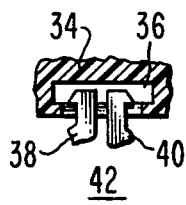
FIGS. 4 and 5 depict the operation of a record extracting mechanism mounted in the player of FIGS. 1 and 2.
Figure 5:
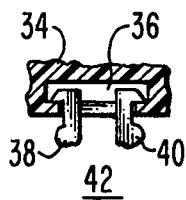

As shown in FIG. 3, the record caddy 25 comprises an outer jacket 26 and a record retaining member 28 removably located within the jacket. The retaining member comprises (1) an annular ring 30, that encircles an enclosed record 32, and (2) a spine 34, which serves as a closure to keep dust and debris from entering the record enclosing cavity. The spine has an opening 36 into which the latch arms 38 and 40 of a record extracting mechanism 42 (FIGS. 4 and 5) protrude during arrival of a record caddy at a fully inserted position in the player.

A function selection lever 44 projects through a slot 46 disposed in the front instrument panel 48 of the cover member, and is subject to selective positioning in one of the three locations thereof: OFF, DISC IN/OUT and PLAY.

A platform 50, movably mounted within the trough member 16 and responsive to the position of the function selection lever 44, is subject to motion between an elevated position and a depressed position. The DISC IN/OUT position and the PLAY position of the function selection lever, respectively, correspond to the elevated position and the depressed position of the platform. A pair of grooves 52 and 54 are provided in rails 56 and 58 mounted on the platform for guiding insertion of a caddy into the player assembly along a path. The front ends of the caddy guiding grooves are aligned with the input slot 24 when the platform is occupying the elevated position for facilitating caddy insertion and extraction.

To a load a record into the player, the latch arms 38 and 40 are disposed in the closed condition (FIG. 4), the function selection lever is shifted to the DISC IN/OUT position to dispose the platform 50 in the elevated position, and an occupied caddy is inserted through the input slot 24. The latch arms 38 and 40 enter the opening 36 in the spine 34 as the caddy reaches the fully inserted position in the player. The engagement of the caddy with an actuating arm indexes the latch arms into the spread apart condition (FIG. 5), whereby the retaining member and the associated record (i.e., the record assembly) are locked to the platform. Subsequent withdrawal of the caddy removes the record assembly therefrom, thereby retaining the record assembly in the player resting on the raised platform. To transfer the retained record to a turntable 60 rotatably mounted within the trough member, the platform is lowered to the depressed position.

For record retrieval, the above sequence is reversed. The platform 50, with the record assembly resting thereon, is raised. The platform is provided with a set of depressible lifting pads (not shown) to align the record assembly resting thereon with the caddy guiding grooves to cause the return of the record assembly into an empty caddy during insertion thereof into the player. The engagement of the caddy with the actuating arm reindexes the latch arms to the closed condition, thereby freeing the record assembly from the player. Subsequent caddy withdrawal removes the enclosed record assembly therewith.

The turntable 60 is driven by a motor 62, as shown in FIG. 2, to rotate at a predetermined speed within preset limits (e.g., 450 rmp±0.01%). U.S. Pat. No. 3,912,283 (Hammond, et al.), describes an illustrative turntable drive arrangement. The turntable is provided with a spindle 64 for centering a record disposed thereon.

A groove-riding pickup stylus 66 is disposed at the free end of a stylus arm 68. The stylus arm is, in turn, pivotally mounted within a demountable pickup cartridge 70. The cartridge is received in a compartment 72 provided in a carriage 74. The platform rails 56 and 58 are additionally provided with grooves 76 and 78 for guiding the carriage along a second path lying parallel to the caddy insertion path. A carriage translating mechanism 80 is provided in the trough member for translating the carriage during playback toward the turntable spindle at a speed correlated to the speed of rotation of the turntable to recover the recorded information from a turntable-supported record. A dial 82, responsive to the position of the carriage along the carriage path, is disposed in the trough member for indicating playing time. The cover member 12 has a readout window 84 for permitting viewing of the dial by the user of the player. A flap 86 is disposed on the cover member for providing access to the demountable pickup cartridge 70.

An apparatus 87 (FIG. 2) for causing motion of the pickup stylus between a lowered position, permitting engagement between the stylus and a turntable-supported record, and a raised position, precluding stylus/record engagement, is mounted in the carriage 74. The pickup stylus is lowered for engagement with a turntable-supported record during playback and active search. The pickup stylus is raised when the player is in a pause mode and when the carriage reaches an end-of-play position. U.S. Pat. No. 4,053,161 (Bleazey et al.) discloses such stylus lifting/lowering apparatus.

The player includes a pause button 88 and a search button 90, which protrude, respectively, through apertures 92 and 94 in the cover member. Actuation of the pause button lifts the pickup stylus away from a turntable-supported record, and halts carriage translation to suspend playback operation. Normal playback is resumed by releasing the pause button.

For active searching of a turntable-supported record, the search button 90 is depressed, and the carriage 74 is translated by means of a manually-operated thumbwheel 96 while the pickup stylus remains in engagement with the turntable-supported record. The carriage is translatable at a speed variable over a range of speeds and in either direction by the thumbwheel. The thumbwheel drive arrangement is also usable for providing special effects (such as repeat play, fast forward and reverse motion). The cover member 12 has a cutout 98 through which access is provided to the thumbwheel. Normal playback is resumed when the search button is released.

Pickup circuits 100, connected to the output of the stylus 66, are mounted in the carriage 74 for developing at the output thereof a signal representative of the prerecorded signals disposed on a turntable-supported record. Signal processing circuits 102, located on a printed circuit board assembly 104 and coupled to the output of the pickup circuits, are mounted in the base member 20 for developing at the output thereof a signal suitable for application to a conventional television receiver. The pickup circuits are illustratively of the type described in U.S. Pat. No. 4,080,625 (Kawamoto, et al.). U.S. Pat. No. 4,097,899 (Yu), describes typical signal processing circuits. A flexible cable 106 is provided for connecting the trough member 16 to the base member. The flexible cable is sufficiently long to allow player operation when the trough member (housing the various player mechanisms) is placed side-by-side with the base member (which houses the player electronics).

The decorative cover member 12, the trough member 16 and the base member 20 are subject to assembly, as shown in FIG. 1, such that the top wall 14 of the cover member, the perimetrical side walls 18 of the trough member and the bottom wall 22 of the base member, respectively, define the top wall, the side walls and the bottom wall of the player assembly 10. A concurrently-filed, copending U.S. patent application, Ser. No. 964,533, of Coleman, entitled "VIDEO DISC PLAYER HAVING MODULAR CONSTRUCTION", is directed toward the modular construction feature of the player of FIGS. 1 and 2.

Figure 6:
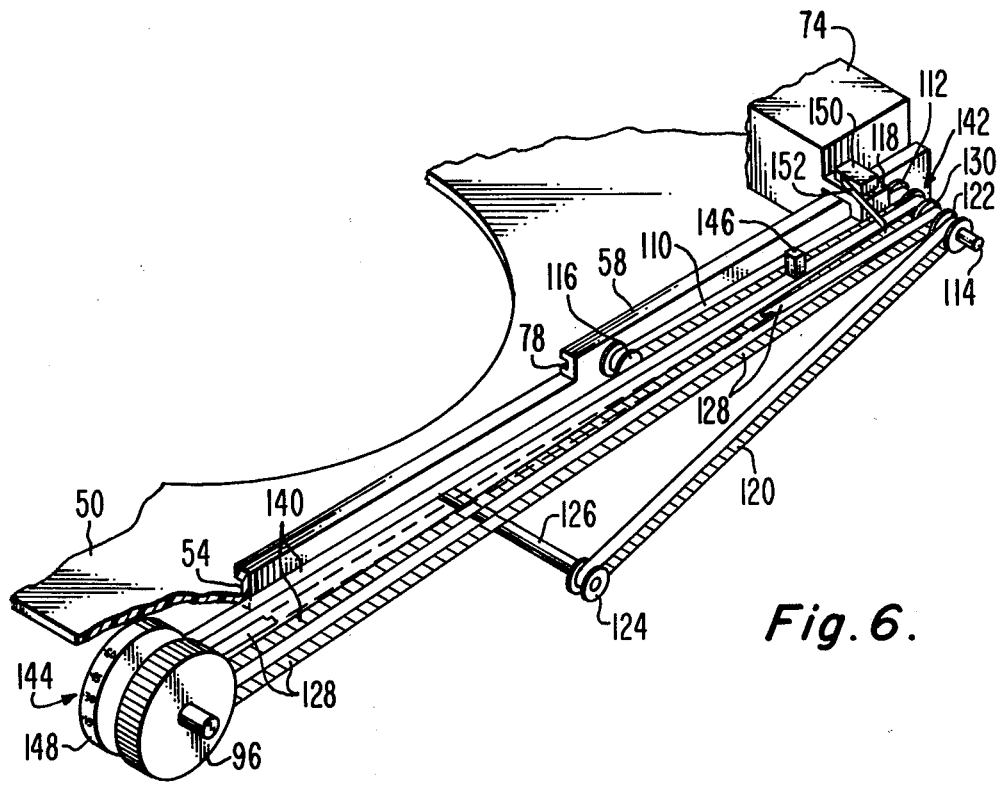
FIG. 6 illustrates a portion of the video disc player of FIGS. 1 and 2 modified to include an apparatus, pursuant to the instant invention, for varying the point at which the end-of-play switch is activated during carriage translation toward the turntable center.

The video disc player of FIGS. 1 and 2 can be modifed, as shown in FIG. 6, to include an apparatus, pursuant to the instant invention, for varying the point at which the end-of-play switch is activated during carriage translation toward the turntable center. As shown therein, the platform 50 is provided with the caddy guiding groove 54 and the carriage guiding groove 78. The pickup carriage 74 is slidably mounted on the platform for translation along a path extending substantially parallel to the caddy path in the manner hereinbefore discussed. An endless drive belt 110 is disposed about a carriage-driving pulley 112, mounted loosely on the platform shaft 114, and an idler pulley 116, rotatably secured to the platform. A carriage-mounted bracket 118 fixedly secures the pickup carriage to the drive belt 110.

An endless play belt 120 is disposed about a turntable-driven pulley 122 and an interim pulley 124, which is driven by the turntable motor 62 via a gear reduction chain 126. A slip clutch (not shown) interposed between the carriage-driving pulley 112 and the turntable-driven pulley 122 drives the carriage toward the turntable center in correlation with the speed of rotation of the turntable during playback.

An endless search belt 128 is disposed about a thumbwheel-driven pulley 130, fixedly secured to the carriage-driving pulley 112, and a pulley (not shown), fixedly secured to the thumbwheel 96. As previously indicated, the pickup carriage 74 is translatable at a speed variable over a range of speeds in either direction by the thumbwheel during active record scanning. The above-described carriage translating mechanism is of the type described in detail in a concurrently-filed, copending, U.S. patent application, Ser. No. 964,530, of Torrington, and entitled "MANUAL SCANNING MECHANISM FOR VIDEO DISC PLAYER".

The apparatus, pursuant to the subject invention, includes a further endless belt 140 disposed about an idler pulley 142, loosely mounted on the platform shaft 114, and a pulley (not shown), fixedly secured to a time-setting wheel 144. The endless belt 140 is disposed along a path lying parallel to the carriage path. The time-setting wheel 144 is manually rotatable to set the position of a stop element 146 fixedly mounted to the endless belt 140. The time-setting wheel 144 is provided with indicia 148 to indicate the position of the movable stop element 146 with respect to the pickup carriage 74. An end-of-play switch 150, having a cantilevered element 152, is fixedly secured to the carriage-mounted bracket 118. The position of the stop element 146 is determined by the time-setting wheel 144 to a location appropriate to the program content of the record subject to play. The engagement of the cantilevered element 152 with the stop element 146 during motion of the carriage 74 toward the turntable center activates the end-of-play switch 150 to cut off power to the turntable motor and to raise the pickup stylus away from a turntable-supported record.

Figure 7:
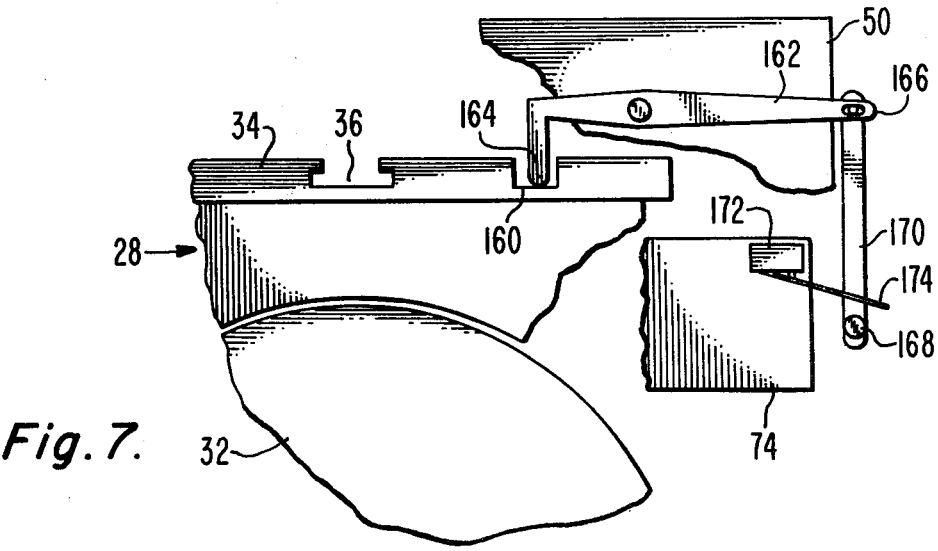
FIG. 7 is a schematic diagram of another embodiment of the subject invention.

FIG. 7 is a diagrammatic representation of an apparatus, in accordance with a further aspect of the instant invention, wherein the position of the movable stop element is automatically set by a mechanically-coded, record caddy to a location appropriate to the playing time of the enclosed record when the caddy is inserted into the player for loading the record. As shown therein, the caddy spine 34 is provided with a cutout 160, the depth of which varies inversely in accordance with the length of program on the enclosed record 32. An actuating arm 162, pivotally mounted on the platform 50, has one end 164 disposed in the path of the record caddy for sensing the depth of the cutout 160 in the caddy spine 34. The other end 166 of the actuating arm 162 determines the position of a stop element 168 mounted on a movable member, taking the form of a platform-mounted slide 170 guided for translation along a path extending parallel to the carriage path. An end-of-play switch 172, fixedly mounted on the carriage 74, has a cantilevered element 174 subject to engagement with the stop element 168 during carriage translation toward the record center to activate the end-of-play switch. The operation of the FIG. 7 embodiment is similar to that of the FIG. 6 embodiment.

Filed concurrently herewith are the following U.S. patent applications: (1) application, Ser. No. 964,531 of L. A. Torrington, entitled "VIDEO DISC PLAYER", (2) application, Ser. No. 964,587, of L. A. Torrington and J. A. Allen, entitled "VIDEO DISC PLAYER HAVING UNITARY RECORD HANDLING PLATFORM CONSTRUCTION", (3) application, Ser. No. 964,536, of J. A. Allen, entitled "CARRIAGE TRANSLATING APPARATUS FOR VIDEO DISC PLAYER", (4) application Ser. No. 964,534, of F. R. STAVE, entitled "VIDEO DISC PLAYER HAVING MANUAL SCANNING FACILITY", (5) application, Ser. No. 964,535, of F. R. Stave, entitled "APPARATUS FOR FACILITATING CARRIAGE RETURN IN VIDEO DISC PLAYER", (6) application, Ser. No. 964,532, of F. R. Stave, entitled "VIDEO DISC PLAYER HAVING RECORD SIDE IDENTIFICATION APPARATUS", (7) application, Ser. No. 964,533, of C. F. Coleman, entitled "VIDEO DISC PLAYER HAVING MODULAR CONSTRUCTION", (8) application, Ser. No. 964,530, of L. A. Torrington, entitled "MANUAL SCANNING MECHANISM FOR VIDEO DISC PLAYER", (9) application, Ser. No. 964,529, of L. D. Huff, entitled "TOGGLE MECHANISM FOR VIDEO DISC PLAYER", (10) application, Ser. No. 964,528, of L. A. Torrington, entitled "RECORD SIDE IDENTIFICATION APPARATUS FOR VIDEO DISC PLAYER", (11) application, Ser. No. 964,527, of L. A. Torrington and L. D. Huff, entitled "CONSTANT DRAG CARRIAGE TRANSLATING MECHANISM FOR VIDEO DISC PLAYER", (12) application, Ser. No. 964,526, of L. A. Torrington and L. D. Huff, entitled "MECHANISM FOR AIDING CARRIAGE RETURN IN VIDEO DISC PLAYER", and (13) application, Ser. No. 964,643, of C. F. Coleman and N. L. Farley, entitled "CADDY-ACTUATED DECLUTCHING MECHANISM FOR VIDEO DISC PLAYER". Reference may be made to these applications for explanation of video disc player features that may advantageously be employed with the present invention.

What is claimed is:

1. A player for use with a disc record subject to removable occupancy of a protective caddy; said player comprising:
   (A) a housing into which an occupied caddy is inserted to load the enclosed record into the player for playback;
   (B) a turntable mounted in said housing for supporting and centering said inserted record;
   (C) means for rotating said turntable;
   (D) a signal pickup for recovering prerecorded information from a turntable-supported record during playback;
   (E) a carriage for supporting said signal pickup;
   (F) means for translating said carriage during playback along a first path toward the center of said turntable in correlation with the speed of rotation of said turntable;

(G) a movable member mounted in said housing for motion along a second path;

(H) a stop element;

(I) a switch element; wherein one of said elements is secured to said carriage, and the other of said elements is secured to said movable member;

(J) means, subject to engagement with said caddy during a caddy insertion, for selectively positioning said movable member along said second path for varying the point at which the carriage-secured element engages the member-secured element during translation of said carriage toward said turntable center along said first path; and (K) means responsive to said engagement of said elements for causing cessation of rotation of said turntable.

2. A player in accordance with claim 1 including means for causing motion of said signal pickup relative to said carriage toward and away from a turntable-supported record; said player further including means responsive to said engagement of said elements for causing motion of said signal pickup away from said turntable-supported record.

3. A player in accordance with claim 1 wherein said movable member comprises an endless belt disposed about a pair of pulleys, and extending parallel to said first path.

4. A player in accordance with claim 3 wherein said positioning means comprises a manually-actuated, time-setting wheel rotatably mounted to said housing, and means for coupling said time-setting wheel to one of said pulleys.

5. A player in accordance with claim 1 wherein said movable member positioning means has a surface exposed for viewing by the user of the player; said player further including a pointer and an indicia indicative of the respective playing times associated with the travel of said carriage from a starting position to a position at which said engagement between said elements takes place; wherein one of said pointer and said indicia is secured to said exposed surface, and the other of said pointer and said indicia is contiguously secured to said housing.

* * * * *